United States Patent
Higgins (10) Patent No.: US 8,666,661 B2
(45) Date of Patent: Mar. 4, 2014

(54) VIDEO NAVIGATION

(75) Inventor: Robert P. Higgins, Seattle, WA (US)

(73) Assignee: The Boeing Company, Chicago, IL (US)

( * ) Notice: Subject to any disclaimer, the term of this patent is extended or adjusted under 35 U.S.C. 154(b) by 392 days.

(21) Appl. No.: 11/396,049

(22) Filed: Mar. 31, 2006

(65) Prior Publication Data

US 2009/0125223 A1     May 14, 2009

(51) Int. Cl.
    *G01C 21/12*            (2006.01)

(52) U.S. Cl.
    USPC .......................................... 701/495; 348/117

(58) Field of Classification Search
    USPC ........... 701/200, 28, 207, 208, 216, 217, 220, 701/221, 494, 495, 409, 468, 469, 472, 474, 701/500, 501, 505; 348/113, E07.085, 116, 348/117; 382/103, 104, 107
    See application file for complete search history.

(56) References Cited

U.S. PATENT DOCUMENTS

| | | | | |
|---|---|---|---|---|
| 3,040,317 | A | * | 6/1962 | Newhouse .................... 342/423 |
| 3,551,681 | A | * | 12/1970 | Astheimer ................. 250/206.1 |
| 4,262,290 | A | * | 4/1981 | Vallins ........................... 345/615 |
| 4,363,104 | A | * | 12/1982 | Nussmeier .................... 382/304 |
| 4,602,336 | A | * | 7/1986 | Brown .......................... 701/223 |
| 4,628,453 | A | * | 12/1986 | Kamejima et al. .............. 701/28 |
| 4,894,658 | A | * | 1/1990 | Hecht-Nielsen et al. ....... 342/90 |
| 4,905,151 | A | | 2/1990 | Welman et al. |
| 4,924,229 | A | * | 5/1990 | Eichel et al. ................. 342/25 E |
| 4,969,036 | A | * | 11/1990 | Bhanu et al. .................. 348/113 |
| 5,027,422 | A | * | 6/1991 | Peregrim et al. .............. 382/294 |
| 5,041,993 | A | * | 8/1991 | Rawlings ...................... 382/304 |
| 5,072,396 | A | * | 12/1991 | Fitzpatrick et al. ........... 701/217 |
| 5,146,228 | A | * | 9/1992 | Irani et al. ........................ 342/64 |
| 5,267,034 | A | * | 11/1993 | Miyatake et al. ............. 348/352 |
| 5,387,947 | A | * | 2/1995 | Shin .............................. 348/699 |
| 5,590,044 | A | * | 12/1996 | Buckreub ...................... 701/507 |
| 5,600,375 | A | * | 2/1997 | Wickstrom ................ 348/400.1 |
| 5,692,062 | A | * | 11/1997 | Lareau et al. ................. 382/107 |
| 5,809,171 | A | | 9/1998 | Neff et al. |
| 5,890,808 | A | | 4/1999 | Neff et al. |
| 5,923,278 | A | * | 7/1999 | Poehler et al. .............. 342/25 C |
| 5,946,422 | A | | 8/1999 | Neff et al. |
| 5,982,930 | A | | 11/1999 | Neff et al. |
| 5,982,945 | A | | 11/1999 | Neff et al. |
| 5,999,129 | A | * | 12/1999 | Rose ............................. 342/394 |

(Continued)

FOREIGN PATENT DOCUMENTS

| EP | 0427431 A3 | 10/1990 |
|---|---|---|
| EP | 0 896 267 A2 | 2/1999 |

(Continued)

OTHER PUBLICATIONS

UK Search Report, Jul. 16, 2007, Boeing.

*Primary Examiner* — Thomas Black
*Assistant Examiner* — Sze-Hon Kong
(74) *Attorney, Agent, or Firm* — Haynes and Boone, LLP (57) ABSTRACT

A system and method for video navigation are disclosed. Motion analysis can be performed upon camera images to determine movement of a vehicle, and consequently present position of the vehicle. Feature points can be identified upon a video image. Movement of the feature points between video frames is indicative of movement of the vehicle. Video navigation can be used, for example, in those instances wherein GPS navigation is unavailable.

12 Claims, 5 Drawing Sheets

(56) References Cited

U.S. PATENT DOCUMENTS

| | | | |
|---|---|---|---|
| 6,025,790 A * | 2/2000 | Saneyoshi | 340/946 |
| 6,049,619 A * | 4/2000 | Anandan et al. | 382/107 |
| 6,157,876 A * | 12/2000 | Tarleton et al. | 701/16 |
| 6,208,937 B1 * | 3/2001 | Huddle | 701/221 |
| 6,252,975 B1 | 6/2001 | Bozdagi et al. | 382/107 |
| 6,411,326 B1 * | 6/2002 | Tabata | 348/47 |
| 6,442,476 B1 * | 8/2002 | Poropat | 701/207 |
| 6,445,983 B1 * | 9/2002 | Dickson et al. | 701/23 |
| 6,580,812 B1 * | 6/2003 | Harrington | 382/107 |
| 6,912,464 B1 * | 6/2005 | Parker | 701/221 |
| 7,062,071 B2 * | 6/2006 | Tsujino et al. | 382/103 |
| 7,123,749 B2 * | 10/2006 | Parker | 382/106 |
| 7,190,282 B2 * | 3/2007 | Maemura et al. | 340/903 |
| 7,242,791 B2 * | 7/2007 | Han et al. | 382/104 |
| 7,248,718 B2 * | 7/2007 | Comaniciu et al. | 382/104 |
| 7,262,713 B1 * | 8/2007 | Vogl et al. | 340/970 |
| 7,266,220 B2 * | 9/2007 | Sato et al. | 382/104 |
| 7,272,502 B2 * | 9/2007 | Lee et al. | 701/214 |
| 7,346,217 B1 * | 3/2008 | Gold, Jr. | 382/236 |
| 7,366,602 B2 * | 4/2008 | Xu et al. | 701/70 |
| 7,405,746 B2 * | 7/2008 | Wakimoto et al. | 348/116 |
| 7,546,026 B2 * | 6/2009 | Pertsel et al. | 396/52 |
| 7,555,143 B2 * | 6/2009 | Flath et al. | 382/109 |
| 7,595,817 B1 * | 9/2009 | Zhang | 348/155 |
| 7,646,887 B2 * | 1/2010 | Goncalves et al. | 382/103 |
| 7,711,476 B2 * | 5/2010 | Chiou et al. | 701/480 |
| 7,712,701 B1 * | 5/2010 | Ehrmantraut et al. | 244/23 C |
| 7,805,244 B2 * | 9/2010 | Park et al. | 701/501 |
| 7,848,542 B2 * | 12/2010 | Hildreth | 382/107 |
| 7,925,051 B2 * | 4/2011 | Gensolen et al. | 382/107 |
| 7,929,728 B2 * | 4/2011 | Guo et al. | 382/103 |
| 8,237,794 B2 * | 8/2012 | Moritz et al. | 348/148 |
| 8,405,723 B2 * | 3/2013 | von Flotow et al. | 348/144 |
| 8,427,472 B2 * | 4/2013 | Moravec | 345/420 |
| 2002/0004691 A1 * | 1/2002 | Kinashi et al. | 701/4 |
| 2003/0012410 A1 * | 1/2003 | Navab et al. | 382/103 |
| 2003/0048357 A1 * | 3/2003 | Kain et al. | 348/144 |
| 2003/0156136 A1 * | 8/2003 | Cattell et al. | 345/771 |
| 2004/0037465 A1 * | 2/2004 | Krause | 382/199 |
| 2004/0076324 A1 * | 4/2004 | Burl et al. | 382/153 |
| 2004/0145667 A1 * | 7/2004 | Apel et al. | 348/301 |
| 2004/0246463 A1 * | 12/2004 | Milinusic | 356/28.5 |
| 2004/0257441 A1 * | 12/2004 | Pevear et al. | 348/144 |
| 2005/0113987 A1 * | 5/2005 | Fink et al. | 701/21 |
| 2005/0127390 A1 * | 6/2005 | Lin et al. | 257/100 |
| 2005/0201593 A1 | 9/2005 | Sawada et al. | |
| 2006/0088191 A1 * | 4/2006 | Zhang et al. | 382/107 |
| 2006/0109341 A1 * | 5/2006 | Evans | 348/14.08 |
| 2006/0140447 A1 * | 6/2006 | Park et al. | 382/104 |
| 2006/0197664 A1 * | 9/2006 | Zhang et al. | 340/555 |
| 2007/0058837 A1 * | 3/2007 | Boregowda et al. | 382/103 |
| 2007/0170667 A1 * | 7/2007 | Xu et al. | 280/5.507 |
| 2007/0217517 A1 * | 9/2007 | Heyward | 375/240.21 |
| 2008/0122607 A1 * | 5/2008 | Bradley | 340/468 |
| 2010/0245589 A1 * | 9/2010 | Sun et al. | 348/169 |

FOREIGN PATENT DOCUMENTS

| | | |
|---|---|---|
| EP | 1 580 687 A1 | 9/2005 |
| SE | 0400977 A | 3/2004 |
| WO | WO 2006/084385 A1 | 8/2006 |

* cited by examiner

VIDEO NAVIGATION

TECHNICAL FIELD

The present invention relates generally to navigation and, more particularly, to a method and system of video navigation that is suitable for use in unmanned aerial vehicles (UAV)s, for example.

BACKGROUND

UAVs are commonly used to provide surveillance in a variety of applications, ranging from battlefield surveillance to the monitoring of high-value assets such as pipelines. UAVs often have an onboard video system that transmits a signal to a distant location, where the video signal is monitored.

UAVs can utilize the Global Positioning System (GPS) as a primary means of providing navigation. However, GPS signals are subject to interference that can inhibit their use for navigation. Such interference can be either intentional or unintentional.

In the event of loss of the GPS signal, or other primary navigation means, a UAV can be programmed to return home. While it may be able to return home without the use of GPS (such as by using heading and last known location), it is likely that its mission will have been seriously compromised by the loss of ability to navigate.

As such, some means for providing backup navigation in the event of a loss of primary navigation is needed. In this manner, the UAV may be able to continue operations without substantial compromise. It is worthwhile to note that other contemporary means of navigation, such as inertial navigation, may not be suitable because of the limited payload capacity of small UAVs. Thus, it is desirable to provide a system for providing the navigation of a small UAV which does not exceed the payload capacity thereof.

SUMMARY

Methods and systems for video navigation are disclosed. For example, according to one or more embodiments of the present invention, a method of video navigation can comprise performing motion analysis upon information from a video camera, such as a video camera that images the ground. By combining the estimated ground motion information with knowledge of the aircraft attitude and the camera pointing angles, the motion of the UAV can be determined.

A set of equations can relate the position of a point on the ground being imaged to the position of the aircraft relative to some fixed coordinate system, given knowledge of the camera pointing angle and the aircraft's attitude. Knowledge of the motion of the point on the ground can then be used to determine the motion of the aircraft. This can be done for a large number of points on the ground, and the result effectively averaged to provide a better solution.

Performing motion analysis upon information from a video camera can comprise identifying a set of feature points in a video image, determining motion of the feature points by how they are mapped from a first image to a second image of the video, and using the motion of the feature points along with the aircraft and camera parameters to determine the motion of a vehicle.

Identifying a set of feature points in a video image can comprise a number of known techniques, including the use of corner detectors and/or the SIFT operator. The present embodiment identifies points where the sum of image gradients in both horizontal and vertical directions exceeds a threshold. The points can be selected from different portions of the video image.

For example, the video image can be divided into a plurality of different cells and then a plurality of points can be selected from the plurality of cells. One point or more than one point can be selected from each cell. The selected points can be those points that have the highest gradient within the each cell. The gradient can be required to exceed a threshold value to assure that the point is suitable for use. Not all cells will necessarily contain at least one suitable point.

Different techniques RANSAC, optical flow, etc. can be used to determine the correspondence between feature points in the first frame and feature points in the second frame. According to one embodiment of the present invention, an optical flow algorithm is used to determine how the feature points are mapped from a first image to a second image. For example, an L-K optical flow algorithm with a multi-resolution pyramid can be used.

Using motion of the feature points to determine motion of the UAV comprises solving a set of equations to compute a motion model for the UAV. Various sets of suitable equations are known. Once the aircraft motion model has been determined from the optical flow, the UAV motion model can then be used to determine the mapping of the feature points from the first image to the second image. Errors between the initial feature point motion estimation based on optical flow, and the feature point estimation based on the aircraft motion model can then be determined.

Feature points where the errors are greater than a threshold are considered outliers and can be removed. The UAV motion model can then be recomputed. This outlier removal process can be iterated until the errors for all remaining feature points are below a threshold.

During the period when GPS is providing a good navigation solution, the differences between the GPS navigation solution and the video navigation solution can be determined. These errors can then be used to determine corrections to be applied to the video navigation solution to increase accuracy, and reduce drift in the video navigation solution when a GPS solution is not available.

Optionally, position fixes can be determined periodically, so as to enhance navigation accuracy. That is, such position fixes can be used to mitigate inaccuracies that accumulate during the use of video navigation. Position fixes can be performed by comparing real-time images of the ground to stored reference images of ground, wherein the positions of the stored reference images are known. In this manner, the location of the aircraft can be precisely determined periodically.

Further exemplary information regarding the use of such position fixes can be found in U.S. Pat. Nos. 5,809,171; 5,890,808; 5,982,930; 5,982,945; and 5,946,422, for example, the contents of which are hereby expressly incorporated by reference in their entirety.

The methods and system for video navigation disclosed herein are particularly well suited for use with UAVs because UAVs typically have onboard video systems, including cameras that are configured to image the ground with sufficient resolution. However, as those skilled in the art will appreciate, the methods and systems for video navigation disclosed herein are also suitable for use in a variety of different applications.

One or more embodiments of video navigation of the present invention can thus be performed when other means of navigation are not functional. In this manner, a UAV can complete its mission after loss of primary GPS navigation capability, for example. As the video camera is already onboard the UAV, additional navigation payload is not required.

The scope of the invention is defined by the claims, which are incorporated into this section by reference. A more complete understanding of embodiments of the present invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

Embodiments of the present invention and their advantages are best understood by referring to the detailed description that follows. It should be appreciated that like reference numerals are used to identify like elements illustrated in one or more of the figures.

DETAILED DESCRIPTION

According to one or more embodiments of the present invention, a navigation system for UAVs or other vehicles is provided. The navigation system can function as a backup navigation system. This navigation system can add very little, or no, size and weight to the UAV. Further, it has very little impact upon power consumption. Generally, most of the hardware required to implement this navigation will already be present on a UAV. Thus, little or no hardware typically needs to be added.

Since one or more embodiments of the present invention adds little size and weight, the present invention can be suitable for use in small UAVs. However, one or more embodiments of the present invention can similarly be suitable for use in larger UAVs and/or other airborne vehicles.

According to one or more embodiments of the present invention, backup navigation is provided to a UAV in the event of loss of the primary GPS navigation solution. The backup navigation can be based upon the use of the existing video data from the surveillance camera of the UAV. As those skilled in the art will appreciate, UAVs are commonly used for some type of surveillance application and thus typically have a suitable video camera already installed.

Because the present invention can use a preexisting onboard video camera and video processing circuitry, little or no additional hardware is required. The backup navigation system of the present invention can acquire knowledge of the UAV's attitude and camera pointing angles from UAV systems. This information is readily available.

The video navigation solution can be computed at the base station operations center and then be transmitted back to the UAV on the command and control link. Calculation of the video navigation solution can alternatively be performed onboard the UAV.

The processor(s) used to compute the video navigation solution can be one or more general purpose processors, one or more custom processors such as application specific integrated circuits (ASICS), or any combination of general purpose processors and custom processors. A small processor or combination of processors is generally sufficient to compute the video navigation solution. In any instance, the calculation of video navigation solution onboard the UAV results in a self-contained backup navigation solution.

Generally, no modification to the existing video camera and related video processing equipment of a UAV is necessary. However, the video camera and/or video processing equipment can be upgraded or otherwise modified if desired.

Having a backup video navigation system according to one or more embodiments of the present invention allows a UAV to continue its mission, uninterrupted, when there is a loss of navigation information from GPS. Advantageously, there may be little or no impact to either the mission or UAV itself.

One aspect of video navigation, according to one or more embodiments of the present invention, is to perform motion analysis of the video output so as to obtain information on position changes of key features between two images in the video sequence. Either consecutive images (one image immediately follows the other, with no other images in between) can be used or non-consecutive images (other images are between the two images) can be used.

Information derived from the video images can be combined with aircraft and camera data, such as attitude, camera focal length, and camera pointing angle, to provide distance, heading, and altitude change information. This information can then be used as the basis for a dead reckoning navigation system. Because this is a dead reckoning type of navigation system, there will typically be drifts in the navigation solution over a period of time.

In order to correct for these drifts, an on-line calibration capability is provided. Errors between the primary GPS provided navigation solution (truth) and the video navigation solution are calculated. These errors are used to estimate the bias errors in the navigation solution. A set of correction coefficients are then determined that can be applied to the video navigation solution to decrease the drift when the primary navigation system is off-line. It is likely that there will still be long term drifts in the video navigation solution.

In order to correct for these long term drifts, periodic position fixes may be required. These position fixes can be obtained using a precision image registration algorithm (PIR). Such a precision image registration algorithm can compare an image from the video output of the UAV's camera with map images stored in a database in order to determine the UAV's position more precisely. That is, images from the UAV's camera are compared to images stored in a database, wherein the images stored in the database have known locations. When a match is found, then the location of the UAV is also known. In this manner, present position information in the navigation system can be updated periodically.

One advantage of the video navigation system of the present invention with respect to the sole use of a precision image registration algorithm is that the video navigation system of the present invention requires substantially less processing power. Thus, by primarily using the video navigation system of the present invention for navigation and only periodically using the precision image registration algorithm, the required processing power is significantly reduced over that required for application of just the precision image registration algorithm.

Given a description of the camera pointing angles relative to the UAV, the UAV's attitude, and the UAV's position relative to some fixed reference coordinate system, it is possible to write a set of equations that define the position of any pixel in an image frame relative to the same fixed reference coordinate. As the UAV moves relative to the reference point, the apparent position of a point on the ground will change position between different image frames of a video in a way that is precisely predictable. By determining how key feature points move from one image to another in the video, it is possible to invert the process and determine how the UAV is moving. This is the basis for one aspect of the video navigation system of the present invention.

Figure 1:
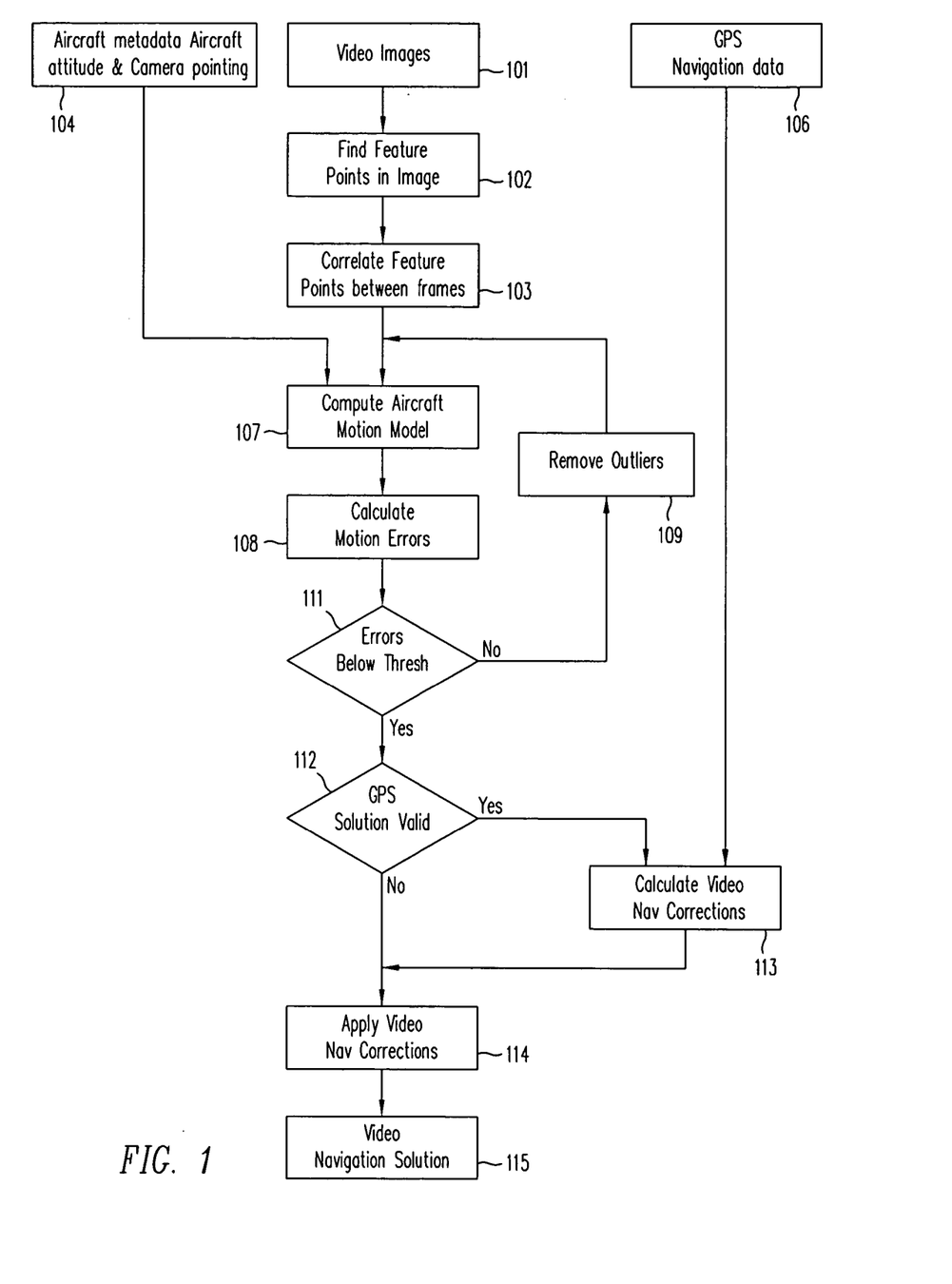
FIG. 1 shows a flow chart illustrating an overview of a method for video navigation in accordance with an exemplary embodiment of the present invention.

FIG. 1 shows a flow chart illustrating an overview of an exemplary embodiment of the present invention. According to this embodiment motion analysis is performed upon information from a video camera of a UAV so as to determine movement, and consequently position, of the UAV over time.

Inputs to the process are the video data or images 101, aircraft metadata 104, and GPS navigation data 106. Aircraft metadata 104 can comprise information regarding the aircraft attitude, the camera pointing angle, and the camera focal length (zoom).

At least one set of feature points is identified in video image 101, as indicated in block 102. Feature points are correlated between frames, as indicated in block 103. Correlating feature points between frames comprises determining which of the feature points present in one frame correspond to feature points in another frame. That is, those feature points that are present from frame to frame are identified and tracked.

The motion of the feature points is determined according to how these feature points are mapped from one video image (an earlier video image) to another video image (a later video image), as indicated in block 103. There are a number of techniques to make the correspondence between the feature points in the first image and the feature points in the second image. An L-K optical flow technique with multi-resolution pyramids can be used in this embodiment of the invention.

The motion of the feature points can be used, along with the aircraft metadata, to determine motion of the UAV, as indicated in block 107. There are often a large number of feature points available to use, and a small number of aircraft motion parameters. This results in an over determined set of equations for the aircraft motion model, and a least squares technique can be used to solve the equations.

Interesting points are points that can possibly be used as feature points. They possess at least some desirable characteristics that make them likely candidates for use as feature points. For example, they may have suitable gradients. Thus, interesting points are potential feature points. However, not all interesting points are necessarily used as feature points.

It is not uncommon for the correspondences between interesting points in two images to be inconsistent with the computed motion model of the aircraft, especially if an interesting point is part of an object (vehicle, person, etc.) that is moving independently from the background. This independent motion can substantially distort the aircraft motion model.

The potential problems caused by such independent motion can be corrected by computing the positions of the corresponding interesting points in the second image based on the positions of the interesting points in the first image and the computed motion model. The errors between these calculated positions and the initial correspondences based on the optical flow are then computed, as indicated in block 108.

An outlier removal process, indicated in block 109, can be used to remove the impact of these errors on the calculated solution, if the errors are not below a threshold as determined in block 111. The top percentages of points with correspondence errors that are above some desired threshold are removed and the motion model parameters are recomputed from the remaining correspondences. This process of removing outliers can be continued until the errors are all below a desired threshold. This process allows independently moving objects to be in the video sequence without distorting the computation of the motion model.

There are a number of error sources that have an adverse impact upon dead reckoning navigation. These errors sources can cause drift in the video navigation solution. One method for compensating for these errors is to do an online calibration of the errors when the primary navigation system, e.g., GPS, is operating. During the time when the GPS is producing a good navigation solution as determined in block 112, the video navigation system can also be running in the background. That is, video navigation corrections can be calculated, as indicated in block 113.

When the GPS navigation solution is lost, the video navigation takes over, i.e., is applied as indicated in block 114 so as to provide video navigation solution 115. The corrections can be used to remove the bias error sources in the video navigation solution.

The use of the corrections to remove the system bias errors will reduce the drift from the dead reckoning navigation solution, but not completely eliminate it. The system may still require periodic position fixes to continue to operate over a prolonged GPS outage. A precision image registration algorithm can be used to periodically provide position fixes based on matching the current video image with an image database. Because the precision image registration algorithm tends to be computationally intensive, it is only invoked periodically to provide the position fixes.

Figure 2:
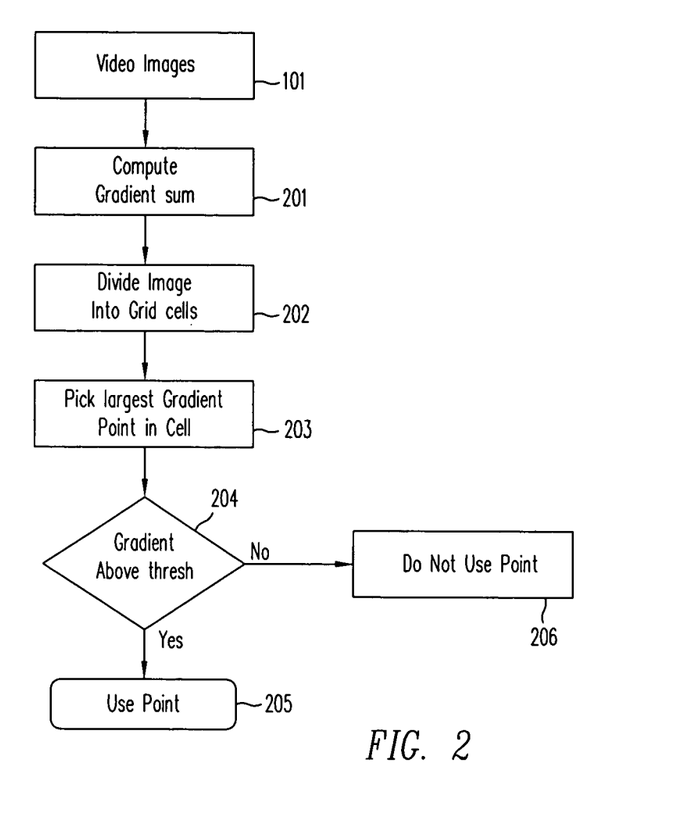
FIG. 2 shows a flow chart illustrating the method of identifying interesting feature points in accordance with an exemplary embodiment of the present invention.

FIG. 2 shows a flow chart illustrating the method of selecting the set of feature points. The sum of the horizontal and vertical gradients is computed for each point in the image as indicated in block 201. Other techniques, such as corner operators, SIFT points, etc. can also be used to identify interesting feature points in an image.

Rather than having a large number of feature points developed in a small area of the image, a selection of interesting points from across the image can be identified so as to enhance accuracy. Such a selection of interesting points can, for example, be obtained by dividing the image into a grid of cells as indicated in block 202. The point with the largest gradient sum in each grid cell is chosen as a feature point in that cell, as indicated in block 203. This chosen point is then compared to a threshold as indicated in block 204, so as to determine if it is interesting enough, e.g., the gradient is above the threshold, to use as a feature point in the motion calculation, as indicated in block 205. If the gradient is below the threshold, then the point is not used as a feature point, as indicated in block 206. The use of such cells tends to spread processing across the image to take advantage of the land area covered by the image in a manner that tends to enhance accuracy.

Figure 3:
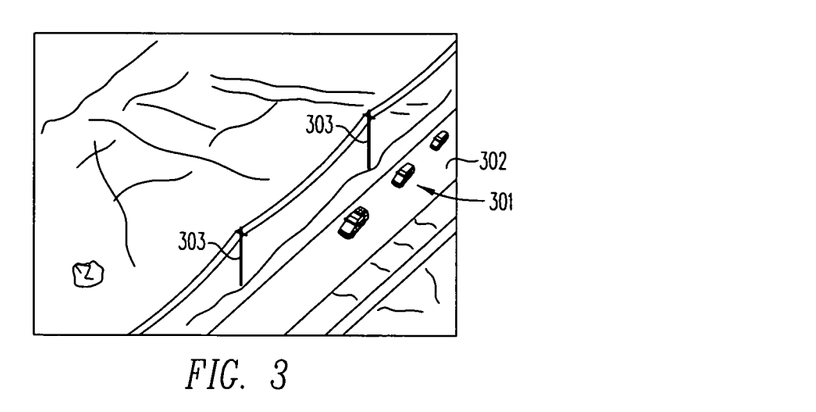
FIG. 3 shows an image of the ground illustrating a first scene, as used in accordance with an exemplary embodiment of the present invention.
Figure 4:
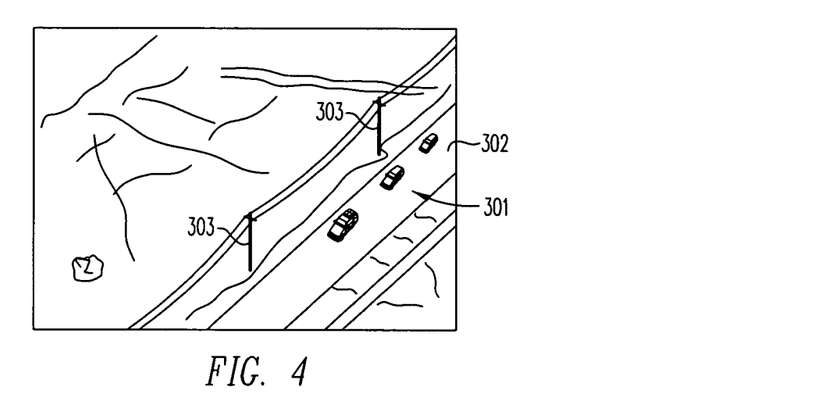
FIG. 4 shows an image of the ground illustrating a second scene as used in accordance with an exemplary embodiment of the present invention, the second scene being at approximately the same location as the first scene and being later in time (in this exemplary image, the second scene is multiple frames after the first scene, so as to exaggerate the motion of the scenes for purposes of illustration)
Figure 5:
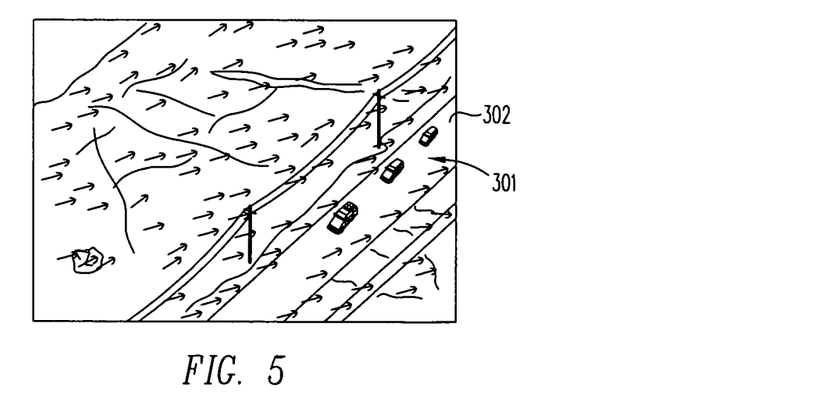
FIG. 5 shows an image of the ground illustrating a plurality of motion vectors applied to the first scene of FIG. 3, according to an exemplary embodiment of the present invention.

FIGS. 3-5 show an example of the image frame registration process and the determination of a set of motion parameters describing the motion of frames in a video sequence. The registration process can be used to determine motion of the feature points of the video images. An affine motion model of the frames in the video sequence can be used to determine the motion of the UAV from the image motion of the ground.

The images of FIGS. 3 and 4 are two frames from the same video sequence. The frames shown are multiple frames apart in order to exaggerate the motion for purposes of illustration. It is worthwhile to note that when the UAV moves, the camera on the UAV also moves, and generally, the entire image frame shifts, rotates, etc. So, it is not just the cars that move in the video image. Everything in the video image typically moves. This movement is one aspect of the physical basis that facilitates video navigation according to one or more embodiments of the present invention.

In practice, such images can be consecutive images or can have one or more intermediate images (can be multiple frames apart). Because the frames of FIGS. 3 and 4 are from the same camera, which is moving with the UAV, and are multiple frames apart, the entire image scene has moved, and the same features in the different images are at different locations in the two different images.

FIG. 5 shows the image of FIG. 3 with motion vectors overlaid. The motion of feature points within the image of FIG. 3 is in the direction of the motion vectors. Each vector can indicate movement of an interesting or feature point in the sequence of video images.

All of the motion vectors in FIG. 5 are approximately the same direction and length. This is not necessarily true in general, but for this set of images it is true. It is worthwhile to note that there are no motion vectors attached to the independently moving objects (such as the cars), because any such motion vectors would not be consistent with the scene motion and thus have been removed through the outlier removal process.

Figure 7:
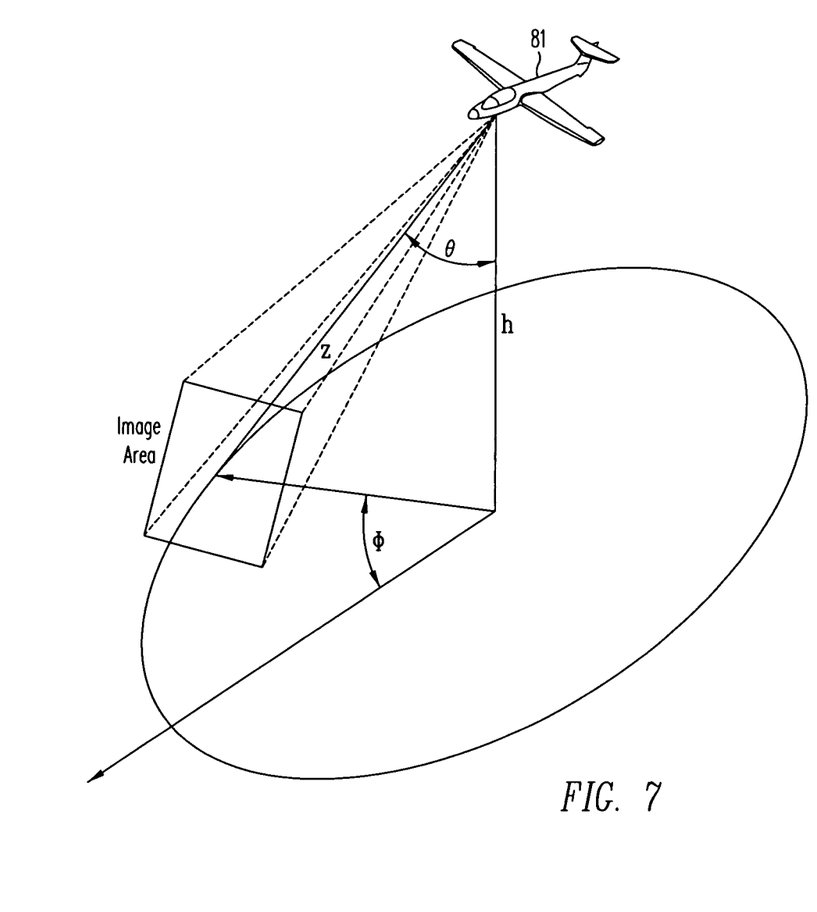
FIG. 7 shows a diagram illustrating the camera pointing angle, aircraft altitude, and distance to the ground being imaged, in accordance with an exemplary embodiment of the present invention.

FIG. 7 shows a simplified diagram showing the relation between the aircraft position, the aircraft attitude, and the imaged point on the ground. Shown are the camera pointing angles, the aircraft altitude, and the distance from the aircraft to the imaged point on the ground. Initially, the aircraft is assumed to be flying generally straight and level over flat terrain. Given the x and y pixel coordinates in the image, the corresponding x and y position on the ground in aircraft coordinates can be found by a simple coordinate rotation based on the camera pointing angles.

FIG. 7 illustrates a camera which has only two degrees of freedom for pointing, and would require only a two angle coordinate rotation. Other camera pointing systems having three degrees of freedom for pointing would require a three axis coordinate rotation. The result of this coordinate rotation determines the location of a point in the image in aircraft coordinates. As the aircraft is unlikely to be actually flying straight and level, another simple rotation based on the aircraft attitude parameters of pitch, roll, and yaw will provide the location of an image point in earth coordinates relative to the nadir point of the aircraft. This relates the imaged feature point to the actual point on the ground.

The change in position of a feature in the second image can then be translated to a change in position of the aircraft. As many feature points are tracked, this results in an over determined set of equations. This set of equations can be solved using a least squares technique.

An assumption in these calculations is that the aircraft is at a low enough altitude that we do not need to account for the spherical nature of the planet Earth. More complex equations can be identified in the case where it is necessary to account for the spherical Earth. There are other sets of equations that can similarly be used to translate the ground point position movement into UAV position.

The motion parameters are in units of pixels at this point, and need to be converted to actual distances in order to provide the needed navigation information. The pixel size in meters can be determined by knowing the camera focal length and the distance from the camera to the pixel location. The distance can be determined by knowing the altitude of the UAV above ground and the orientation of the camera to local horizontal.

Figure 6:
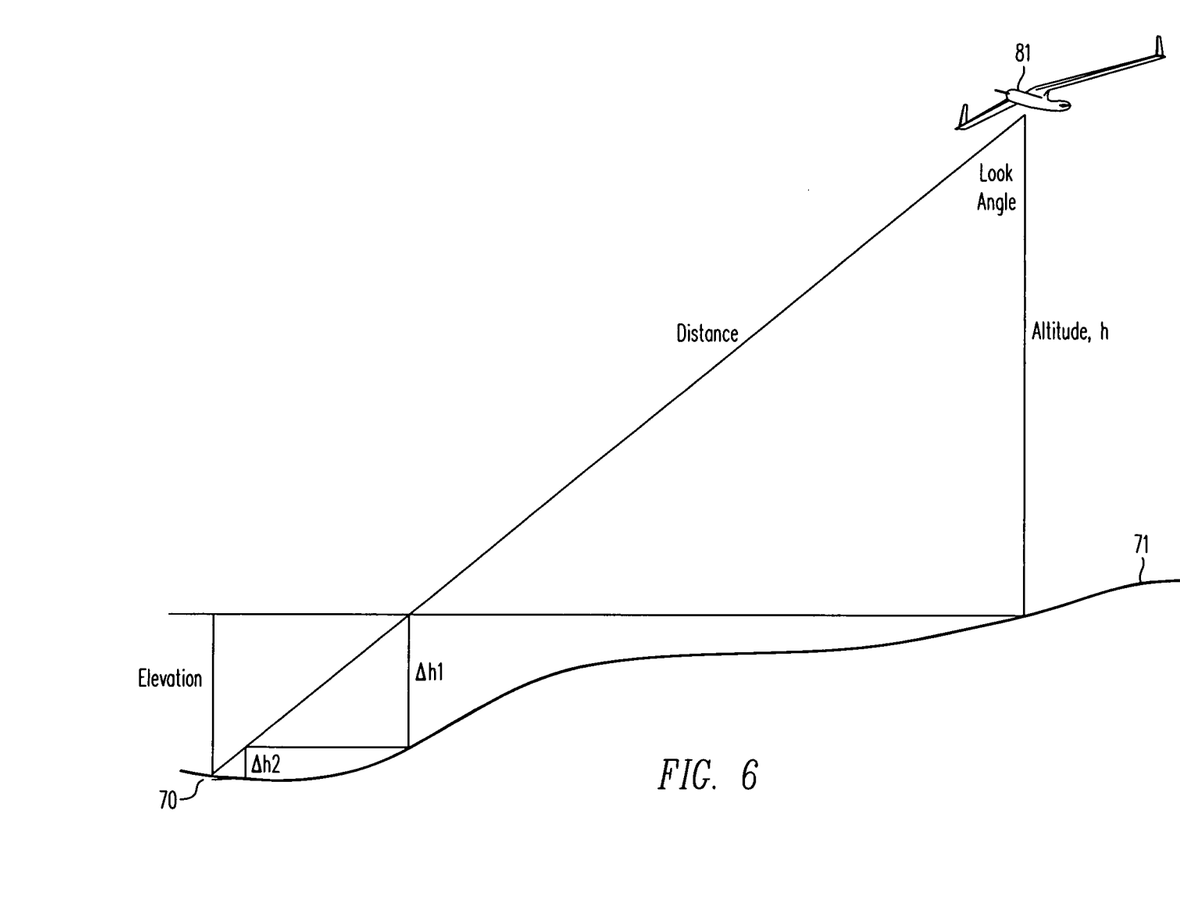
FIG. 6 shows a diagram illustrating a method of distance determination that takes into consideration differences in ground elevation, in accordance with an exemplary embodiment of the present invention.

Changes in the terrain height also need to be accounted for in the determination of the distance to the pixel location. The elevation data for the terrain can be determined from the Digital Elevation Terrain Database (DTED). FIG. 6, discussed in further detail below, is a schematic diagram showing the features in the distance determination. FIG. 6 is a schematic diagram showing the geometry involved in determination of the distance from the UAV 81 to a point of interest 70 in a video image of the ground 71. This distance needs to be corrected so as to properly account for the difference in altitude between the altitude above ground 71 at the position of aircraft 81 and the altitude of aircraft 81 above the point of interest 70. Differences in these altitudes can occur due to difference in the elevation of the ground at different points. This correction accounts for the effective altitude at the location of the camera pointing angle.

The process of determining the altitude at the camera pointing location can be an iterative process. The X and Y displacements are determined as discussed above for a given set of aircraft parameters assuming that the altitude of the imaged ground point is the same as that of the aircraft. The altitude at the imaged point location can be looked up in the Digital Terrain Elevation Database (DTED) and the new altitude is used to re-compute the X and Y offsets, which again are used to find a new altitude. This is iterated until the change in altitude is below a desired threshold. Thus, the range to the ground 71 along the camera pointing direction can be determined. Along with the known focal length of the camera and other camera parameters, the distance represented by a pixel can be determined.

Figure 8:
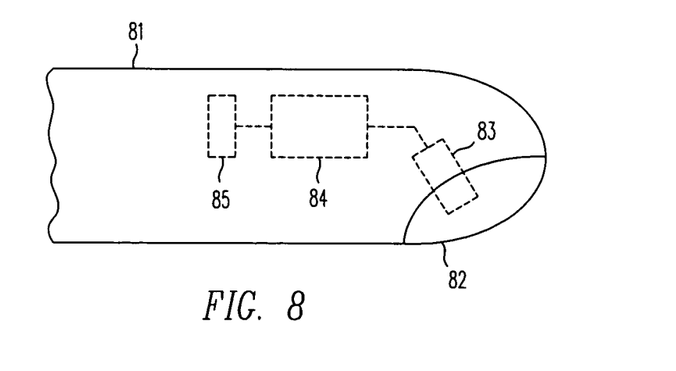
FIG. 8 shows a block diagram illustrating a portion of a UAV having video navigation according with an exemplary embodiment of the present invention.

FIG. 8 shows a block diagram illustrating a portion of UAV 81 having video navigation equipment disposed therein, according to an exemplary embodiment of the present invention. A window 82 formed in UAV 81 facilitates imaging by video camera 83. Video camera 83 can be used for both surveillance and video navigation.

Video camera 83 provides a video signal to processor 84. Processor 84 can be either a general purpose processor or a custom processor. Processor 84 performs processing to facilitate surveillance according to well known principles and performs processing to facilitate video navigation according to one or more embodiments of the present invention.

Optionally, additional processing can be provided. For example, additional processor 85 can perform processing functions that are unavailable in processor 84 or can merely augment processing by processor 84 (such as by performing processing functions that are available in processor 84).

All or a portion of the processing required for the practice of the present invention can be performed via a collocated (with respect to camera 83) processor, such as processors 84 and 85. Alternatively, all or a portion of the processing can be performed via a remote processor, that is located some distance from camera 83. For example, the remote processor can be located at the location for which the UAV is remotely controlled.

The navigation system of one or more embodiments of the present invention is discussed herein as being suitable for use in unmanned aerial vehicles (UAVs). However, the present invention is also suitable for use in a variety of vehicles.

Various airborne vehicles, such as airplanes, helicopters, missiles, and rockets can use one or more embodiments of the present invention substantially as discussed herein. Thus, discussion herein of the use of one or more embodiments of the present invention with UAVs is by way of example only, and not by way of limitation.

Embodiments described above illustrate but do not limit the invention. It should also be understood that numerous modifications and variations are possible in accordance with the principles of the present invention. Accordingly, the scope of the invention is defined only by the following claims.

I claim:

1. A method of navigation for an aircraft, the method comprising:

during a period when a primary GPS navigation system is operating:
(a) capturing a first image frame and subsequent second image frame of ground features from a video camera mounted on the aircraft,
(b) identifying a set of feature points in the first and second image frames by dividing each image frame into grid cells each having a plurality of points, selecting from each grid cell a single point with a largest gradient as the largest gradient point for the corresponding grid cell, and identifying the set of feature points as those largest gradient points that exceed a threshold gradient,
(c) determining a change of position of the feature points by how they are mapped from the first image frame to the second image frame including identifying feature points that are moving with respect to a background of the first image frame by determining expected positions of the feature points on the second image frame based upon a position of the feature points in the first image frame and based upon a predetermined motion of the aircraft, wherein moving feature points are removed from the set of identified feature points,
(d) within a processor, translating the change of position for the feature points into a video-determined change of position for the aircraft, and
estimating bias errors in the video-determined change of position using a GPS-derived change of position to obtain an on-line calibration of the bias errors; and during a period of loss of a primary GPS navigation solution:
repeating acts (a) through (d) to obtain the video-determined change of position,
correcting the video-determined change of position according to the bias errors to provide a corrected video-determined change of position,
periodically determining position fixes to update the corrected video-determined change of position, and
navigating the aircraft by dead reckoning based upon the aircraft's corrected video-determined change of position.

2. The method of claim 1, wherein translating the change of position for the feature points is responsive to an altitude of the aircraft, a camera focal length for the video camera, and a camera pointing angle for the video camera.

3. The method of claim 2, wherein the translating the change of position comprises determining a distance from the aircraft to ground positions corresponding to the feature points based on an altitude of the aircraft above ground and the camera point down angle.

4. The method of claim 3, further comprising:
determining terrain heights of the ground positions corresponding to the feature points by looking up a database of terrain elevation; and
correcting the distance from the aircraft to the ground positions corresponding to the feature points in response to the terrain heights of the ground positions corresponding to the feature points.

5. The method of claim 4, wherein the correcting the distance comprises:
recomputing the ground positions corresponding to the feature points in response to the corrected distance; and
repeating the determining of the terrain heights and the correcting of the distance using the recomputed ground positions.

6. The method of claim 3, wherein the translating the change of position further comprises converting a pixel unit representation of the change of position for the feature points into the video-determined change of position based on the distance from the aircraft to the ground positions corresponding to the feature points.

7. The method as recited in claim 1, wherein determining how the feature points are mapped from a first image to a second image comprises using an optical flow algorithm.

8. The method as recited in claim 1, wherein determining how the feature points are mapped comprises using an L-K optical flow algorithm with a multi-resolution pyramid.

9. The method of claim 1, wherein the position fixes are determined by comparing images of objects on the ground to objects of stored images, wherein positions of the objects of the stored images are known.

10. The method of claim 1, wherein the processor is collocated with respect to the video camera.

11. The method of claim 1, wherein the processor is located remotely with respect to the video camera.

12. The method of claim 1, wherein each image frame is divided into approximately 10 by 15 grid cells.

* * * * *